(12) United States Patent
Viaud et al.

(10) Patent No.: US 7,805,912 B2
(45) Date of Patent: Oct. 5, 2010

(54) AUTO TENSIONING SYSTEM FOR SURFACE WRAP

(75) Inventors: Jean Viaud, Gray (FR); Henry D. Anstey, Ottumwa, IA (US)

(73) Assignee: Deere & Company, Moline, IL (US)

( * ) Notice: Subject to any disclaimer, the term of this patent is extended or adjusted under 35 U.S.C. 154(b) by 79 days.

(21) Appl. No.: 12/244,206

(22) Filed: Oct. 2, 2008

(65) Prior Publication Data
US 2009/0094948 A1   Apr. 16, 2009

(30) Foreign Application Priority Data
Oct. 5, 2007   (EP)   ................... 07117990

(51) Int. Cl.
  *B65B 41/12*   (2006.01)
(52) U.S. Cl. .............. 53/389.4; 53/389.2; 53/211; 53/399; 53/587; 100/87; 100/8; 100/6
(58) Field of Classification Search ............ 53/211, 53/215, 389.4, 399, 465, 587, 589, 389.2; 100/87, 88, 89, 8, 6
See application file for complete search history.

(56) References Cited

U.S. PATENT DOCUMENTS

| | | | | |
|---|---|---|---|---|
| 6,164,050 A | * | 12/2000 | Vande Ryse et al. | 56/341 |
| 6,651,408 B1 | * | 11/2003 | McClure | 53/587 |
| 6,796,109 B2 | * | 9/2004 | Viaud | 53/587 |
| 7,322,167 B2 | * | 1/2008 | Chapon et al. | 53/389.2 |
| 7,395,756 B2 | * | 7/2008 | Meinders | 100/87 |
| 2003/0172629 A1 | * | 9/2003 | Viaud | 53/588 |
| 2004/0016204 A1 | * | 1/2004 | Chow et al. | 53/67 |
| 2007/0157556 A1 | * | 7/2007 | Feraboli et al. | 53/399 |
| 2007/0289454 A1 | * | 12/2007 | Meinders | 100/88 |

FOREIGN PATENT DOCUMENTS

EP   1 099 366   5/2001

* cited by examiner

*Primary Examiner*—Hemant M Desai (57) ABSTRACT

A wrapping means tensioning device is provided for a round baler and comprises an idler assembly and an application assembly. Wrapping means, like net, when drawn during a wrapping cycle acts onto the idler assembly, which in turn will press an application element of the application assembly against a roll, on which wrapping means is stored. This provides for proper tension during a wrapping cycle without the need for springs or the like, the force of which would need to be overcome, when a wrapping device is brought into a non-operative loading mode.

18 Claims, 7 Drawing Sheets

AUTO TENSIONING SYSTEM FOR SURFACE WRAP

FIELD OF THE INVENTION

The invention relates to a surface wrapping means tensioning device comprising a moveable application element acting directly or indirectly on a wrapping means roll and an idler element between the wrapping means roll and an object to be wrapped, deflecting said wrapping means, as well as to a round baler.

BACKGROUND OF THE INVENTION

EP B1 1 099 366 discloses a device to load a net roll into a net wrapping system, wherein in an operative position, in which net can be drawn from a roll, a brake roll acts onto the surface of the net roll. The braking force is built up by a gas accumulator, which is tensioned by means of crank arms and links by an operator into a closed position.

The problem this invention is based on is seen in the need to have crank arms and links or other big lever arm(s) to tension the gas spring or any other spring. This is an even greater problem, where the components are difficult to access, such as when the net wrap system is situated in the front of a round baler above the tongue.

SUMMARY OF THE INVENTION

According to the description herein no gas or other spring is needed to apply force on the wrapping means, as the tension is created by the wrapping means itself, like net, plastic, paper or any other means. The application element can be a simple rigid bar or one or more rolls on such a bar. Said application element may act onto the outer surface of a roll of wrapping means or it may act on an axle on which said roll is carried or onto a disc being rotatably connected to said axle. The application element could also be a flat or bent sheet metal, a grid or the like. The idler element is an element, over which the wrapping means is guided and which deflects the wrapping means out of a straight line or plane. The idler element can again be a rigid bar or revolving parts on an axle. Said rolling parts may rotate freely or against a brake force. It becomes apparent, that the force acting on the wrapping means and thus decelerating its movement will be the higher, the higher the deflecting movement and the stronger the force resulting from the deflecting will be. This means, that by properly selecting the length of lever arms etc. the braking force can be adjusted. This braking force will apply only, when the wrapping means is drawn over the idler element, which means that no force will act, when a new roll of wrapping means is loaded.

By disconnecting the application element from the idler element it is possible to pivot the application element out of the way, such that a new roll with wrapping means can be inserted, whereas the idler element may rest in its position. Furthermore the application element can also be removed or swung away if access is needed to the wrapping means, like if an obstruction occurs. Disconnect may happen by an ordinary removal of a pin, a hook, a latch or other means, for which preferably no tool is required.

Since the diameter of a wrapping means roll will decrease during operation, and since the application element will follow the outer diameter of the wrapping means roll, the geometrical relationship between the application element and the idler element will change. In order to assure, that the application element is applied against the wrapping means by the idler element in all positions a one way clutch or similar means, like a wheel-ratchet coupling are provided, which will adjust infinitely or in steps to the new relationship between these elements. The application element will always rest and act on the wrapping means, if it is hindered from moving away. One way of doing this is a one way clutch of any type, which ultimately may be even a spring, which assures, that the application element can move only towards, rather than away from the wrapping means roll.

In order to keep the idler element in close contact with the wrapping means even if no pulling force is acting on it, i.e. in a non-wrapping stage, a force, like from a mechanical or gas spring acts on it, which however must be smaller than the force built up by the pulled and deflected wrapping means. Again, by choosing the proper dimensions this force can be adjusted to the size of and the forces acting in the machine, in which the wrapping means shall be used.

The application element will always stay in close contact with the wrapping means and will immediately exert its braking force, if a spring presses it against the wrapping means or if it is elastic in itself and is put under pretension by the idler element during wrapping. If it is elastic in itself, this may happen by choosing an elastic material like plastic, thin sheet metal or bars, or by an assembly of parts between which springs (coil, spiral, flat) may act.

Undue movement of the idler element or of the application element will be avoided and proper alignment between them will be maintained, if the path of the idler element is restricted like with a slot, stops, a cable or chain, etc. This will help to assure, that the tensioning device does not bring itself into a state of self-squeezing.

A roll on which the wrapping means roll rests and over which the wrapping means is trained over a considerable part of its circumference, will—especially if provided with a high friction surface—assure, that the wrapping means does not slip and sufficient tension can be built up in it, which also has the ability to deflect the idler element. When the wrapping means is routed to the idler element on the side of the roll opposite of the wrapping means, the angle of surrounding the roll with wrapping means can be adjusted and the whole device can be created with little space required.

While a special case could be provided to receive the wrapping means roll and to keep it in place it is preferred to use existing parts like the roll and/or the application element to locate it. Depending on the friction needed on the circumference of the wrapping means roll to build up a certain pulling force in the wrapping means one may chose between a fixed surface on a stationary part having a high friction surface as one extreme and a freely rotating roll as another extreme to act on the roll.

The application element may perform an additional function, if it is used as a loading platform and if said wrapping means roll can be brought from or by means of an application assembly into a position in which wrapping means may be withdrawn. For that purpose the application assembly may be formed as a covered surface, as an assembly consisting of transverse and longitudinal bars, straps, etc., which e.g. may be pivoted as an assembly about a bearing, and where appropriate a lever or motor may be provided to assist in this pivot movement if the wrapping means roll is too heavy.

While this invention may be used in any type of a round or roll baler, it is applied preferably on a mobile round baler as it is used in agriculture, forestry or industry, like for tobacco, garbage, cotton etc. i.e. at places where loading and installation of wrapping means happens manually and where operators can hardly reach the wrapping device like at the front of a round baler and above a tongue.

BRIEF DESCRIPTION OF THE DRAWINGS

Two embodiments of the invention will be described in more detail below with reference to the drawings wherein.

DESCRIPTION OF THE PREFERRED EMBODIMENT

Figure 1:
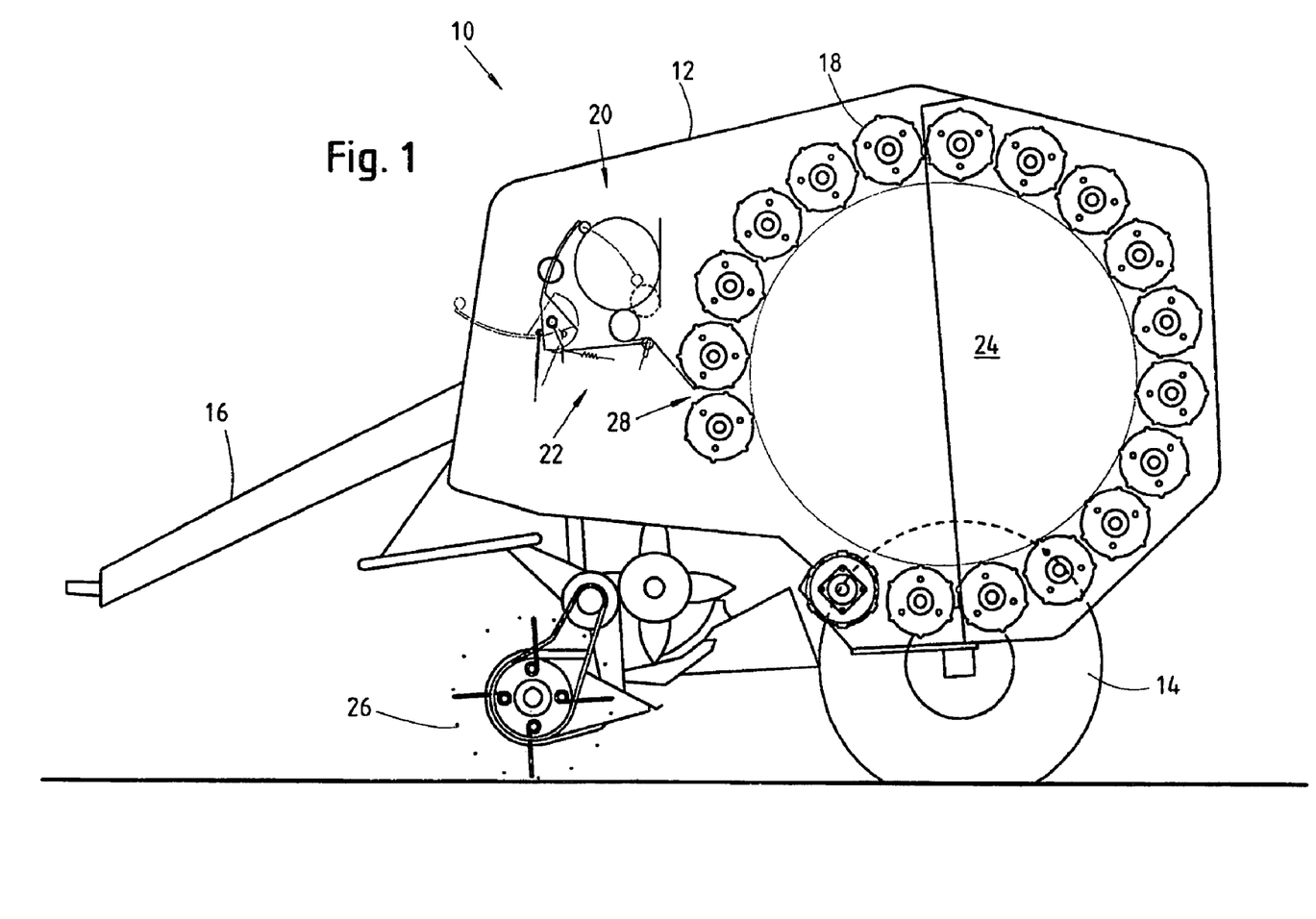
FIG. 1 is a schematic side view of a round baler, being provided with a wrapping means tensioning device.

FIG. 1 illustrates a round baler 10 having a frame 12, wheels 14, a tongue 16, pressing elements 18, a wrapping device 20 and a wrapping means tensioning device 22.

The round baler 10 illustrated is of the type used in agriculture and is thus widely known. It is of the fixed chamber type, which is just a choice; it could be of the variable chamber or of the hybrid type.

The frame 12 is an assembly of parts bolted or welded together as is well known, to create a bale chamber 24 and to carry a crop pick-up 26 and other components not shown.

The wheels 14 and an axle (not shown) support the frame 12 on the ground to be pulled over a field.

The tongue 16 connects to the frame 12 at the front side thereof and is used to connect the round baler 10 to a tractor (not shown). As can be seen in FIG. 1 and depending on the overall size of the round baler 10, the wrapping device 20 may easily be at a height of app. 1.6-1.8 meters.

The pressing elements 18 in this case are shown as rigid, rotatable rolls being located substantially in a circle, whereas in the lower front area an entrance is provided to enter crop and whereas the pressing elements 18 are located in a moveable and in a stationary housing which can be moved apart from each other to eject a bale. Instead of the rolls, belts, chains, etc. could be used as pressing elements 18. The pressing elements 18 leave a gap 28 to feed wrapping means into the bale chamber 24.

The wrapping device 20 is determined to feed wrapping means 32 into the bale chamber 24 to wrap a bale (not shown) therein. Besides a cutting and a feeding device, which both are not shown for the sake of brevity, but are of ordinary and well known design, the wrapping device 20 comprises a wrapping means tensioning device 22, which will be explained in more detail below.

The wrapping means tensioning device 22 to carries a roll 34 with wrapping means rolled on it and delivers it to the bale chamber 24 thereby applying a certain tension in the wrapping means 32. Hereto the wrapping means tensioning device 22 comprises a roll 36, an idler assembly 38 and an application assembly 40.

Figure 2:
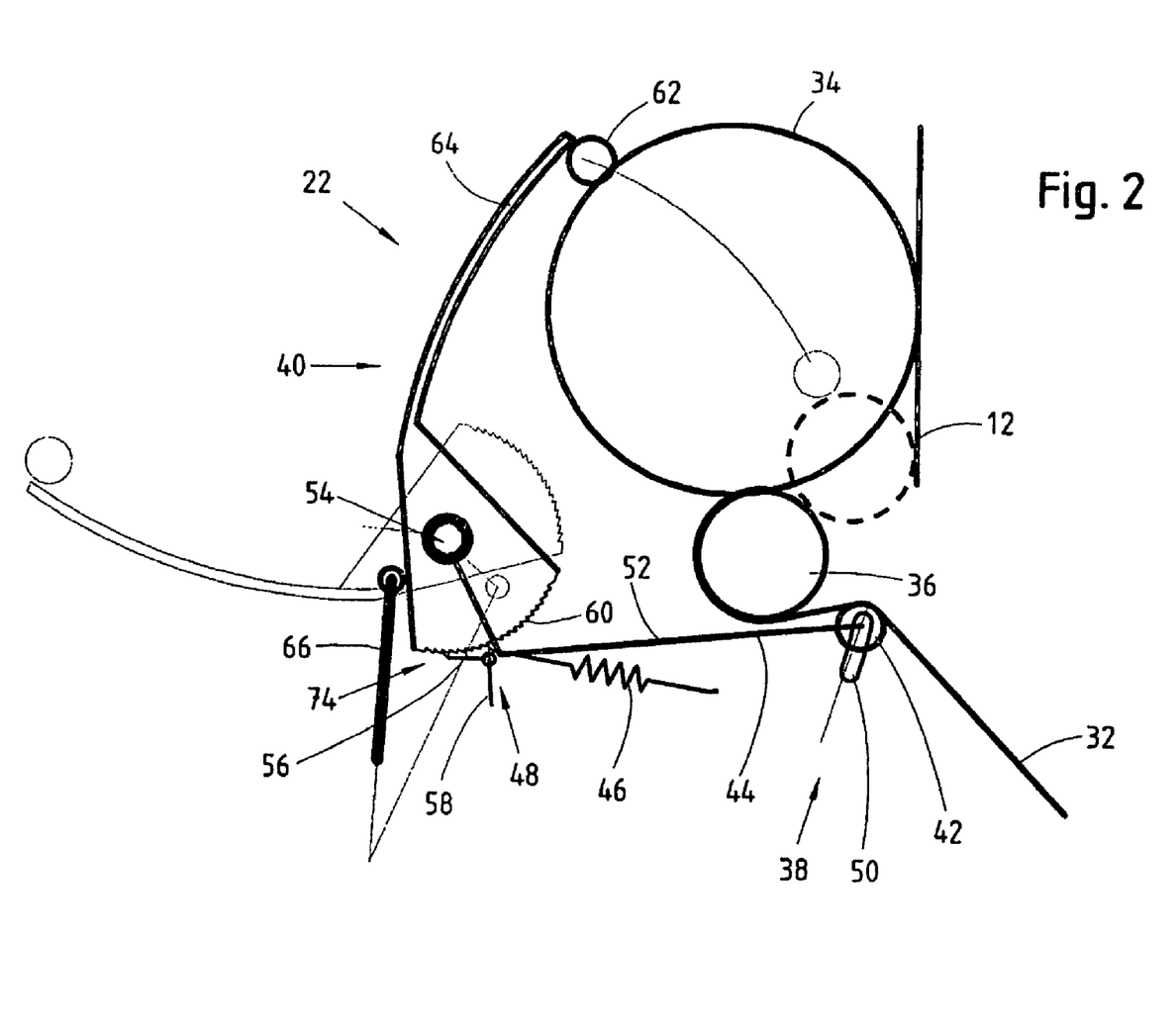
FIG. 2 is a side view of the wrapping means tensioning device according to a first embodiment in an operational state shown in solid lines.

The roll 36 is oriented such, that its longitudinal axis runs parallel to that of the roll 34 and of the pressing elements 18. Roll 36 is journaled in the frame 12 by known bearings and is covered with rubber to apply high friction forces on the wrapping means 32. The roll 36 is located with a distance to a part of the frame 12, like a wall, whereas said distance is smaller than the diameter of the core of the roll 34 after all wrapping means 32 is used up. Finally, roll 36 supports roll 34 in the operation mode.

The idler assembly 38 comprises an idler element 42, an idler linkage 44, a spring 46 and a ratchet 48. The idler assembly 38 serves to use energy from the pulling force of the wrapping means 32 and to translate it into a braking force for the wrapping means 32. The idler assembly 38 is located underneath the roll 36 with a pivoting axis, again being parallel to the axis of rotation of the roll 36.

The idler element 42 is formed as a roll journaled on a cross-bar (not shown), but received by the ends of the idler linkage 44 at both sides. The idler element 42 is preferably as long as the rolls 34 and 36, but may be shorter or longer as well. The idler element 42 is moveable along its radial line for a short distance determined by slots 50 formed in another part of the frame 12. The orientation and location of the slots 50 and the travel range of the idler element 42 are chosen such that the idler element 42 is always laterally of a straight line extending between the gap 28 and the line on the roll 36, from which the wrapping means 32 departs.

The idler linkage 44 has two arms 52, each with a long and a short leg assuming substantially an inversed L-shape, in which both legs are rigidly connected to each other. At the free end area of the long legs the cross bar or a bearing for the idler element 42 is received. The free end area of the short leg is journaled on a shaft 54 fixed to the frame 12 and having a longitudinal axis parallel to that of the idler element 42. The long and the short leg include an angle of about 100 degrees. As a result of this design the idler element 42 pivots in a vertical direction about the shaft 54 within limits defined by the slots 50.

Spring 46 is formed as a coil tension spring, but could be of any other type as well, and is, in this case, fixed with its one end to the frame 12 and with its other end to the ratchet 48. The location and orientation of the spring 46 is such, that it activates the ratchet 48 and at the same time pivots the idler linkage 44 towards the roll 36, whereas it is moved against the force of the spring 46 by the deflected wrappings means 32 as will be explained later.

The ratchet 48 is pivotally connected to the idler linkage 44, in this case, where the short and the long leg meet. The ratchet 48 has a driver leg 56 and a handle 58, which are rigidly connected to each other. The driver leg 56 is determined to engage in a tooth profile 60 on the application assembly 40, whereas the handle 58 will be used to bring said driver leg 56 out of engagement with said tooth profile 60. Engagement of the driver leg 56 with the toothed profile 60 will be provided by means of the spring 46. Ratchet 48 and toothed profile 60 form a one-way clutch 74.

The application assembly 40 comprises an application element 62, application arms 64 and a spring 66. It is the purpose of the application assembly 40 to transfer the movement received from the idler assembly 42 into braking movement acting onto the roll 34 with wrapping means 32.

The application element 62 is either formed as a bar rigidly kept at its ends by the application arms 64; or it is formed as another roll, rotatably received on a crossbar fixed with its ends to the application arms 64. The application element 62 contacts the outer surface of the roll 34 either on its entire length or on parts of it only. In the case of a rigid bar it may also be provided with a rubber layer.

The application arms 64 are provided at least on each side of the round baler 10 and receive in one end area the application element 62 and are provided with the toothed profile 60 at the other end. The application arms 64 may pivot on shaft 54 between a loading position—dashed lines in FIG. 2, solid lines in FIG. 4—and an operation position, shown in solid lines in FIG. 2. While an upper part of the application arms 64 is formed like a sheet metal or strap, its lower part is substantially of triangular shape in the center of which it is journaled on shaft 54.

The spring 66 is formed as a gas spring, a coil pressure spring or any other kind, which is suitable to pivot the application arms 64 towards the roll 34, i.e. in FIG. 2 in a clockwise direction. The spring 66 is attached with one end to the frame 12 and with the other end to the respective application arm 64, assuming one is provided for each. In the embodiment shown, the connecting point of the spring 66 at the application arm 64 moves from one side of the shaft 54 to the other and thereby passes a dead center position thereby. As a result the spring 66 assists a movement of the application assembly 40 into the loading position as well as into the operation position, in which the application element 42 applies against the roll 34.

The toothed profile 60 forms the lower edge of the substantially triangular part of the application arm 64. The teeth of the toothed profile are of the saw type and are dimensioned and oriented such, that the driver leg 56 can engage with them in one direction, but slides over them in the opposite direction.

Figure 3:
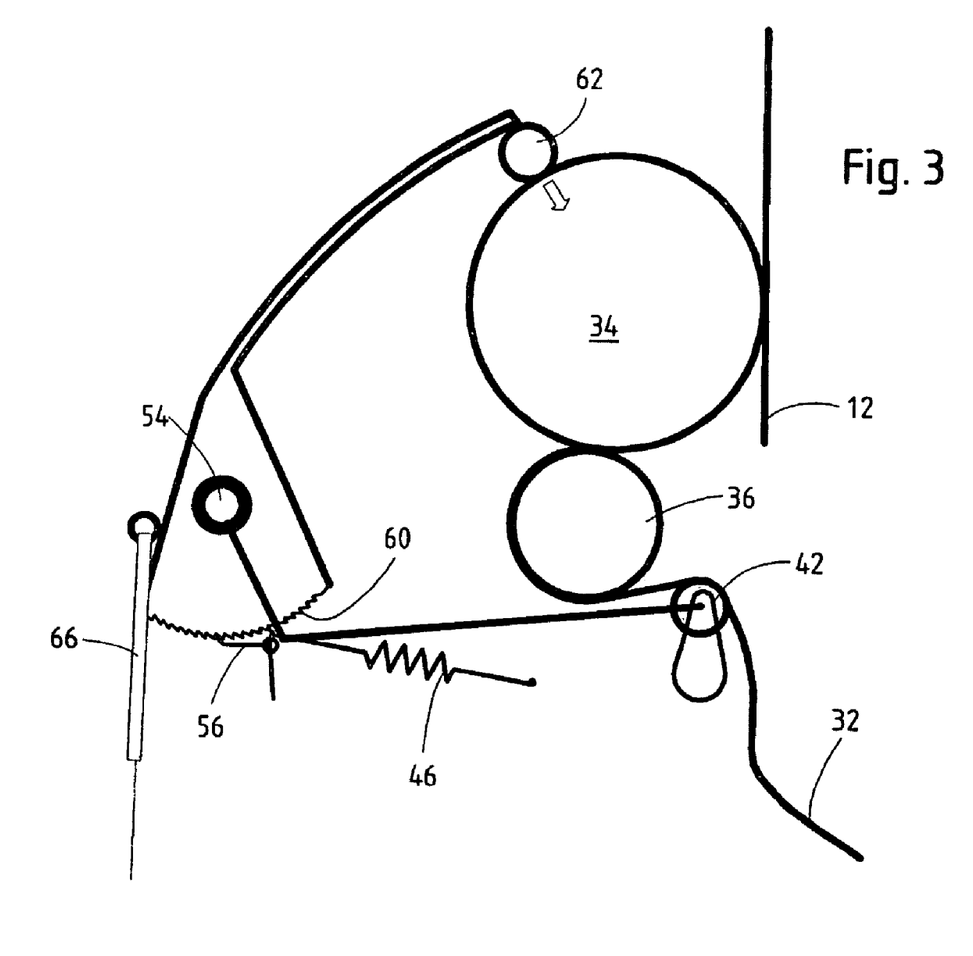
FIG. 3 is the wrapping means tensioning device according to FIG. 2 in a non-operational state, in which no tension appears in the wrapping means.
Figure 4:
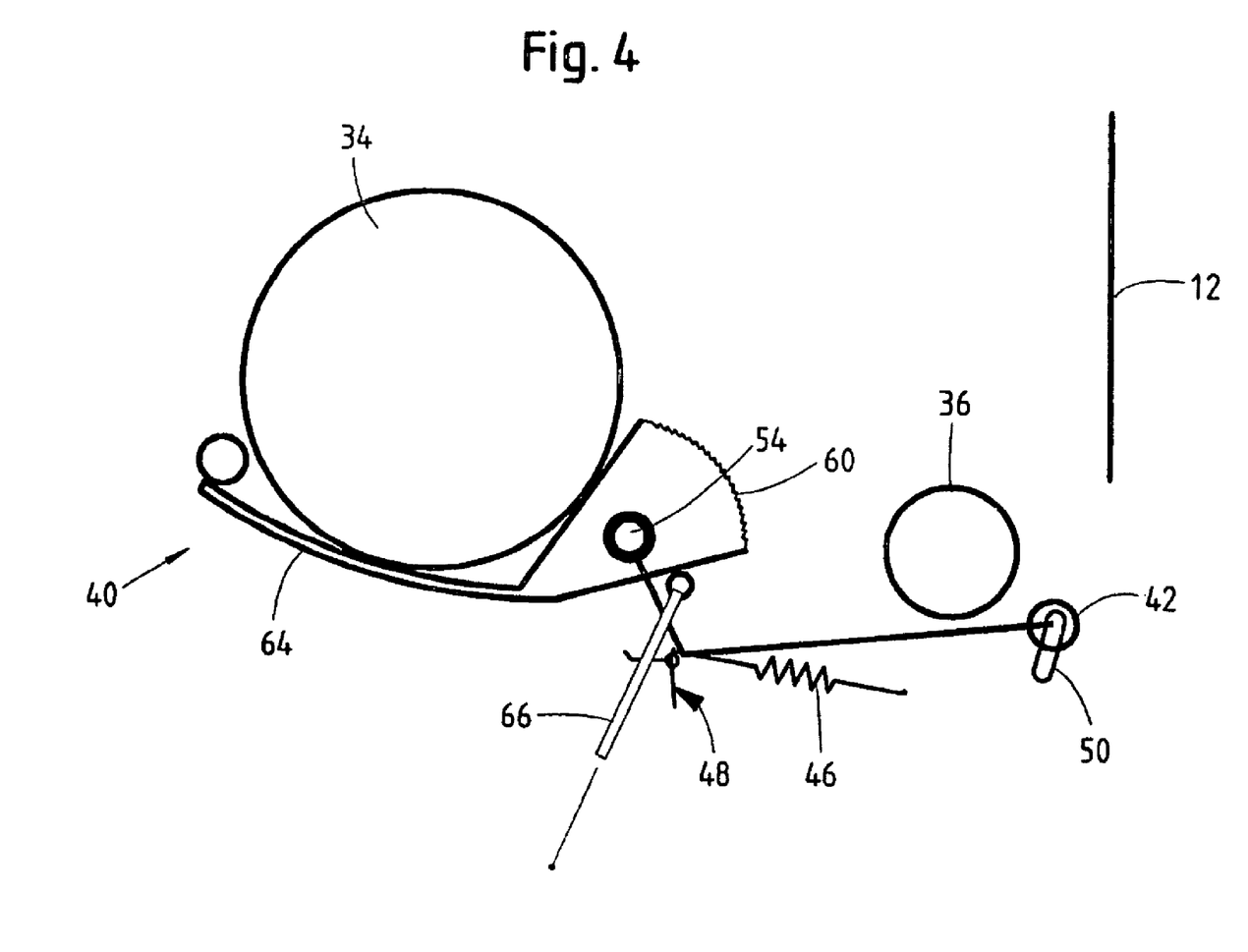
FIG. 4 is the wrapping means tensioning device according to FIG. 2 in a loading state.
Figure 5:
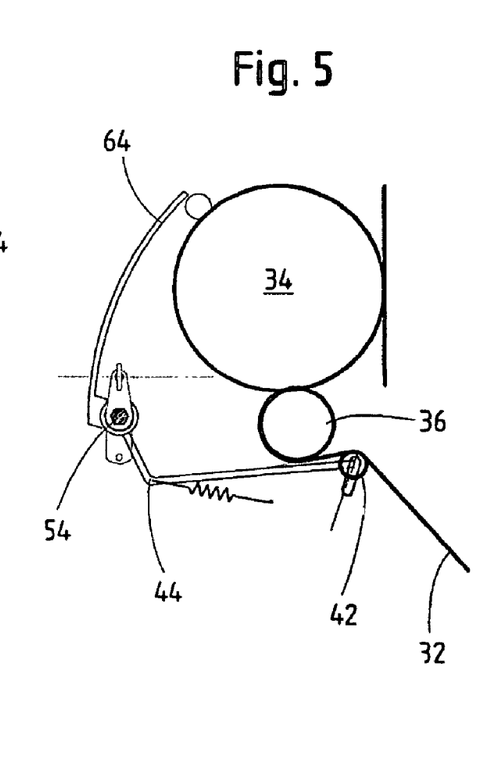
FIG. 5 is a side view of the wrapping means tensioning device according to a second embodiment in an operational state.

Starting from this description the first embodiment will operate as follows, starting from a situation as it is shown in FIG. 4. The application assembly 40 assumes a loading position, in which the application arms 64 form sort of a trough in which the roll 34 with rolled-up wrapping means 32 may be stored. The ratchet 48 is out of engagement with the toothed profile 60 and the idler element 42 assumes its uppermost position at the end of the slots 50, to which it is urged by the springs 46. The springs 66 are extended. In order to bring the wrapping means tensioning device 22 into its operation mode, the application assembly 40 is pivoted about shaft 54 in clockwise direction when looking onto FIG. 4. At the end of this pivoting movement—see FIG. 3—the roll 34 will assume a position between the frame 12, the roll 36 and the application element 62. The wrapping means 32 will be routed over the roll 36 at the side opposite the idler element 42, then over the idler element 42 and finally into the gap 28. As soon as the drive leg 56 gets into contact with the toothed profile 60 it will be forced between two teeth by the spring 46. The spring 66 now acts on the other side of the shaft 54 and urges the application element 62 against the surface of the roll 34. Idler element 42 is still in its upper position due to the action of springs 66. As it can be seen in FIG. 3 the wrapping means 32 is still loosely hanging over idler element 42. Reference is now made to FIG. 2, solid lines. As soon as the wrapping means 32 is fed through gap 28 into the bale chamber 24 by any means, like a so-called duck-bill, by feeding rollers, by a blower or the like, and after the wrapping means 32 is pulled by a bale rotating in the bale chamber 24 tension will build up in the wrapping means 32. This tension tends to move idler element 42 into a position, in which the wrapping means 32 can follow a straight line, although this is not possible ultimately, since the slots 52 limit the said movement. As soon as the idler element 42 and the idler arms 44 pivot about shaft 54, ratchet 48 will push the toothed profile 60 in clockwise direction about shaft 54. This clockwise rotation will cause the application arm 64 to press against roll 34. With decreasing diameter of roll 34 the application arms 64 will follow its surface assisted by the virtue of the spring 66, which will also avoid, that the application element 62 gets off the roll 34. With decreasing diameter of the roll 34 also the toothed profile 60 will pass the driver leg 56 and after a certain movement the driver leg 56 will enter the next teeth gap, which assures, that a movement of the idler element 42 will always cause a movement of the application element 62. Once the roll 34 is used up, ratchet 48 will be disconnected from the toothed profile 60 by pushing on handle 58. This will allow an operator to pivot the application assembly 40 in counterclockwise direction into the position shown in FIG. 2 in dashed lines.

Reference is now made to FIGS. 5 to 8 showing the second embodiment. As to be seen especially in FIG. 5 except the ratchet 48 and toothed profile 60 assembly and the spring 66 first and the second embodiment are identical.

Figure 7:
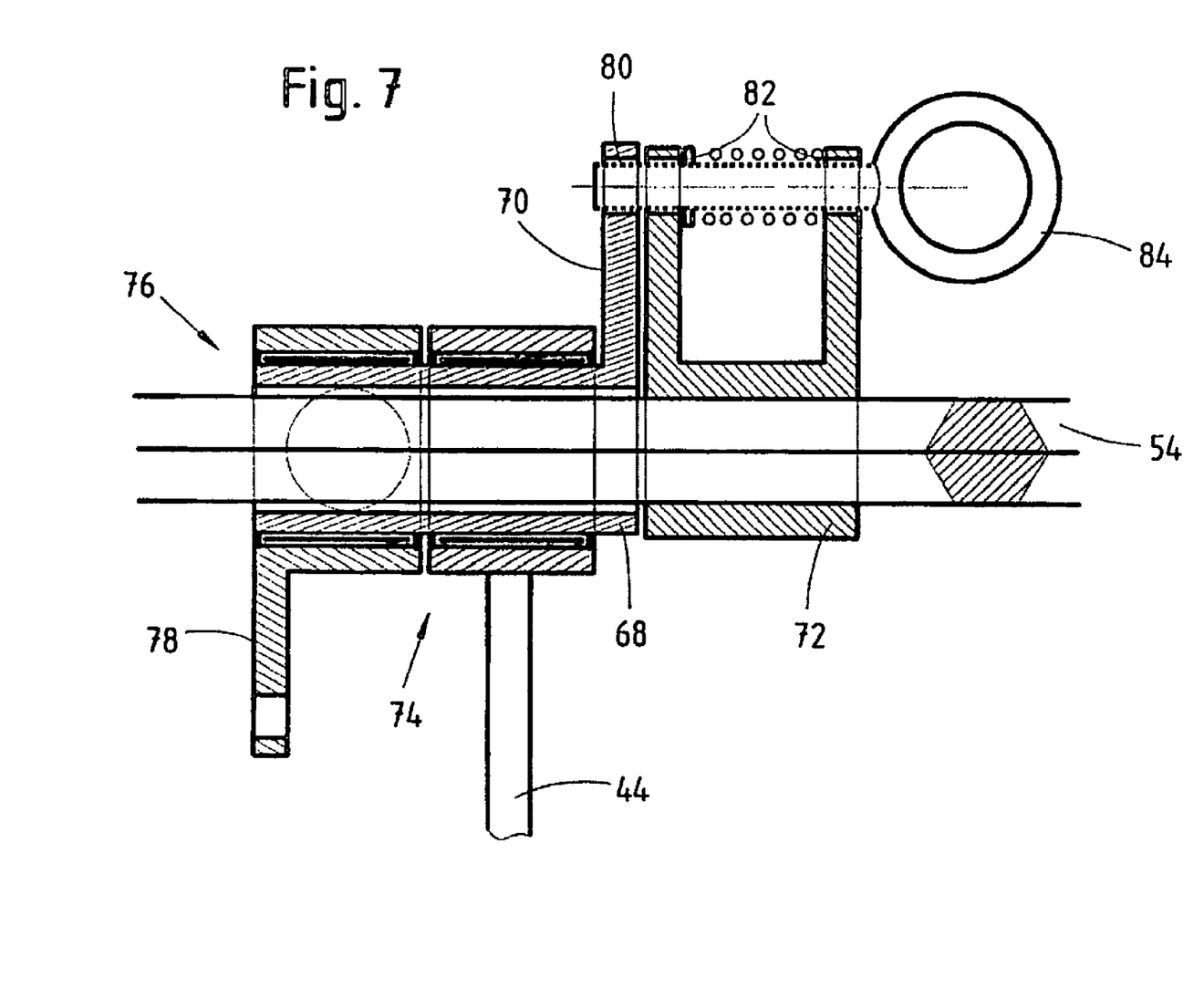
FIG. 7 is a coupling used in the wrapping means tensioning device to connect or disconnect an application element to/from an idler element; and, FIG. 8 is the wrapping means tensioning device according to FIG. 5 in side view, but with an application arm formed flexible in itself.

As can be seen in FIG. 7 shaft 54 is freely rotatable received in a hub 68 having a radially extending arm 70 and carries rotatably fix an arm 72, which can be brought into alignment with and close to each other. Idler arm 44 is journaled on said hub 68 by means of one-way clutch 74, which now has the ratchet 48 and toothed profile 60 in the space between the bushing like end area of idler arm 44 and the hub 68. Instead of the toothed profile 60 another friction surface may be used, which provides for drive in one direction and no drive in the opposite direction. This one-way clutch 74 may be an off-the-shelf item installed in said space. This one-way clutch 74 will act in the same way and in the same direction as the one of the first embodiment.

Application arms 64 are rotatably fixed on shaft 54 at both of its ends to rotate with it as described with respect to the first embodiment.

Beside one-way clutch 74 and also on the hub 68 is provided another one-way clutch 76, now between the hub 68 and a retainer 78 fixed to the frame 12. One-way clutch 76 acts similarly to spring 66 in as much as it keeps the application element 62 in contact with roll 34. This is because shaft 54 is rigidly connected to the application arms 64 as well as to the hub 68 via arm 72 and can rotate in the retainer 78, i.e. with respect to the frame 12 only in one direction. Instead of this other one-way clutch 76 other means, like spring 66, may be provided to assure, that application element 62 rests on roll 34.

Arm 70 has one or more bores 80 or notches in its remote end area.

Arm 72 is of the fork type with a series of aligned bores 82, which can be brought into a position in which they are aligned with bore 80 in arm 70. Bores 82 slidably receive a pin 84, which is urged in known manner by a spring towards bore 80, but can be drawn apart from it, such that both arms 70, 72 can pass each other.

Figure 6:
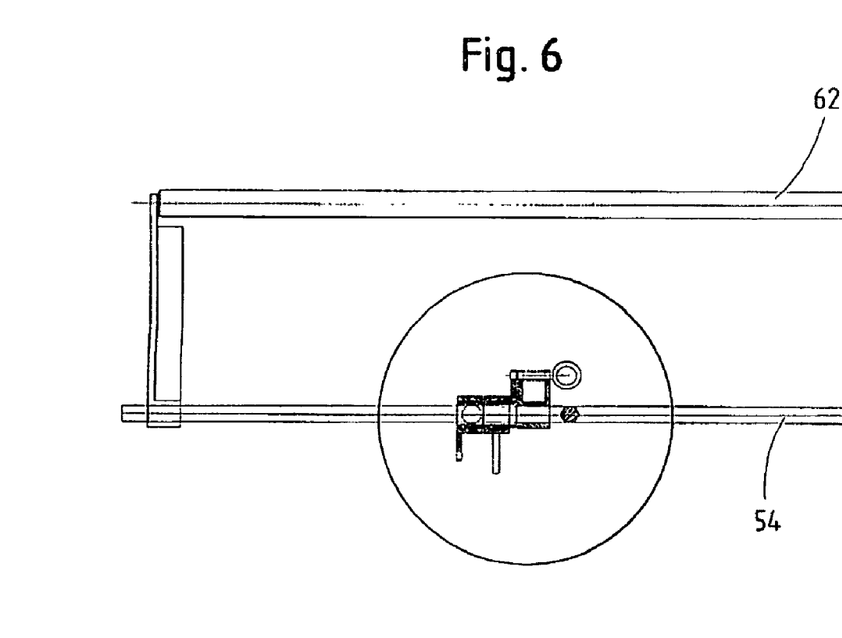
FIG. 6 is a front view the wrapping means tensioning device according to FIG. 5.

According to FIG. 6 one hub 68 in the middle of the whole assembly may be sufficient; however if appropriate one hub 68 may be provided in both end areas of shaft 54.

Subsequent to the foregoing description the function of the second embodiment is as follows. Once roll 34 is in its operation position and wrapping means 32 is drawn by the bale and deflecting idler element 42, idler arm 44 will via one-way clutch 74 rotate hub 68 and via arms 70, 72 and pin 84—now protruding through all bores 80, 82—also shaft 54 and thereby application arms 64 as in the first embodiment. In order to bring application arms 64 into a loading position similar to that shown in FIG. 4, pin 84 is pulled out of bore 80 and thus application arms 64 are free to rotate with shaft 54 to the loading position, since the one-way clutches 74, 76 are rendered ineffective as they act on the hub 68, rather than on shaft 54. After a new roll 34 is loaded into the wrapping device 32 pin 84 is reinserted into bore 80. In case bores 80, 82 would not match, either another bore or notch 80 may be selected or hub 68 may be rotated until all bores 80, 82 match.

Figure 8:
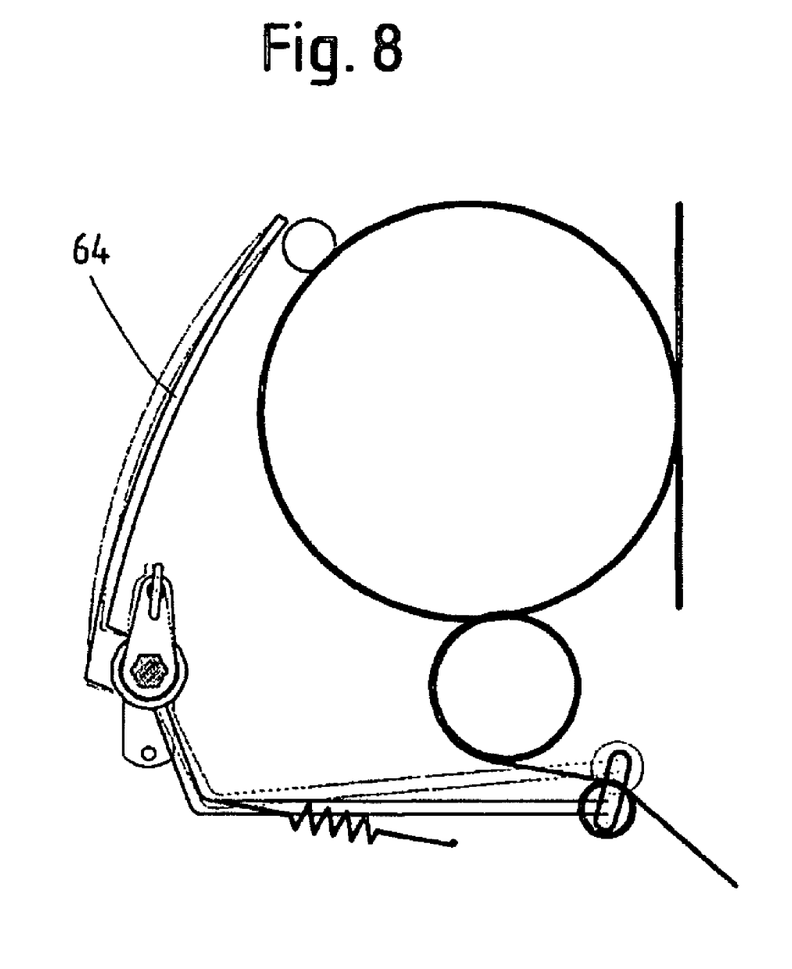

As to be seen in FIG. 8, application arms 64 maybe elastic in themselves to apply always a minimum pressure onto roll 34.

Having described the preferred embodiment, it will become apparent that various modifications can be made without departing from the scope of the invention as defined in the accompanying claims.

The invention claimed is:

1. A wrapping means tensioning device comprising an application assembly having a moveable application element acting on a wrapping means roll and an idler element between the wrapping means roll and an object to be wrapped, deflecting said wrapping means, wherein:
   the application assembly supports the wrapping means roll during a loading operation and is moveable between a loading position and a operating position; and,
   the idler element is connected to the application element to cause its movement as a result of the deflection during wrapping.

2. A wrapping means tensioning device according to claim 1, wherein the application element can be disconnected from the idler element.

3. A wrapping means tensioning device according to claim 1, wherein the idler element is connected to the application element by means of a one way clutch, which transmits movement, if the idler element is deflected by the wrapping means during operation.

4. A wrapping means tensioning device according to claim 1, wherein the application element is connectible to a stationary member by means of another one way clutch.

5. A wrapping means tensioning device according to claim 1, wherein the idler element is applied by a force acting against the deflection and being smaller than the deflection force.

6. A wrapping means tensioning device according to claim 1, wherein the application element is one of spring loaded and formed as a spring.

7. A wrapping means tensioning device according to claim 1, wherein the path of the idling element is limited in at least one direction.

8. A wrapping means tensioning device according to claim 1, wherein a freely rotatable roll, which on one side supports the wrapping means roll and on the other side of which the idling element is provided.

9. A wrapping means tensioning device according to claim 1, wherein the wrapping means roll is located between the application element, the freely rotatable roll and one of a stationary and fixed element.

10. A wrapping means tensioning device comprising an application assembly having a moveable application element acting on a wrapping means roll, the application assembly having a tooth profile connected with the application element and an idler assembly having an idler element between the wrapping means roll and an object to be wrapped, deflecting said wrapping means and a ratchet, wherein:
    the ratchet engages the tooth profile to connect the idler element to the application element as a one way clutch, thereby transmitting movement to the application element to cause its movement as a result of the deflection during wrapping.

11. A wrapping means tensioning device according to claim 10, wherein the application element can be disconnected from the idler element.

12. A wrapping means tensioning device according to claim 10, wherein the application element is connectible to a stationary member by means of another one way clutch.

13. A wrapping means tensioning device according to claim 10, wherein the idler element is applied by a force acting against the deflection and being smaller than the deflection force.

14. A wrapping means tensioning device according to claim 10, wherein the application element is one of spring loaded and formed as a spring.

15. A wrapping means tensioning device according to claim 10, wherein the path of the idling element is limited in at least one direction.

16. A wrapping means tensioning device according to claim 10, wherein a freely rotatable roll, which on one side supports the wrapping means roll and on the other side of which the idling element is provided.

17. A round baler according to claim 10, wherein the wrapping means roll is located between the application element, the freely rotatable roll and one of a stationary and fixed element.

18. A wrapping means tensioning device according to claim 10, wherein an application assembly is provided to carry the wrapping means roll and preferably also to bring it into an operative position.

* * * * *